United States Patent
Ewing et al.

[11] Patent Number: 6,056,352
[45] Date of Patent: May 2, 2000

[54] SUNROOF ASSEMBLY FOR AN AUTOMOTIVE VEHICLE AND CONTROL SYSTEM FOR OPERATING A SUNROOF ASSEMBLY

[75] Inventors: Kip A. Ewing, Dearborn; James M. Helms, Southgate, both of Mich.; Oluf H. Bendixen, Westengrund, Germany; Mark A. Caye, Allen Park, Mich.; John D. Goins, Redford, Mich.; David A. Smith, Macomb Township, Macomb County, Mich.

[73] Assignee: ASC Incorporated, Southgate, Mich.

[21] Appl. No.: 08/464,847

[22] PCT Filed: Jul. 5, 1994

[86] PCT No.: PCT/US94/07716

§ 371 Date: Oct. 22, 1997

§ 102(e) Date: Oct. 22, 1997

[87] PCT Pub. No.: WO96/01192

PCT Pub. Date: Jan. 18, 1996

[51] Int. Cl.$^7$ ........................................ B60J 7/00
[52] U.S. Cl. .............. 296/214; 296/216.03; 296/220.01; 296/221; 296/223; 200/61.69
[58] Field of Search .............................. 296/214, 216.07, 296/216.08, 220.01, 222, 223, 231, 218, 216.03; 200/61.69, 61.71

[56] References Cited

U.S. PATENT DOCUMENTS

| | | |
|---|---|---|
| 3,955,848 | 5/1976 | Lutz et al. . |
| 4,185,868 | 1/1980 | Kaltz et al. . |
| 4,420,184 | 12/1983 | Kaltz . |
| 4,556,835 | 12/1985 | Vogel et al. . |
| 4,566,730 | 1/1986 | Knabe et al. . |
| 4,601,091 | 7/1986 | Grimm et al. . |
| 4,601,512 | 7/1986 | Boots . |
| 4,619,480 | 10/1986 | Motoyama et al. . |
| 4,626,023 | 12/1986 | Lutz . |
| 4,630,860 | 12/1986 | Fuerst et al. . |
| 4,643,478 | 2/1987 | Boots . |
| 4,647,106 | 3/1987 | Furst . |

(List continued on next page.)

FOREIGN PATENT DOCUMENTS

| | | |
|---|---|---|
| 0290106 | 11/1988 | European Pat. Off. . |
| 1257321 | 2/1969 | France . |
| 1946161 | 3/1971 | Germany . |
| 2234852 | 1/1974 | Germany . |
| 2318391 | 10/1974 | Germany . |

(List continued on next page.)

OTHER PUBLICATIONS

"Ford 1973 Car Shop Manual", vol. 4 Body, Ford Marketing Corporation, pp. 46–10–05 through 46–10–8, 46–11–01 through 46–11–07.

A.K. Legg, SAAB Owners Workshop Manual, 1981, 1986, pp. 240 and 241.

ASC drawing No. C–49X5–0001–AXXX entitled "Housing Assembly–Complete" (Mar. 24, 1995).

*Primary Examiner*—Dennis H. Pedder
*Attorney, Agent, or Firm*—Harness, Dickey & Pierce, P.L.C.

[57] ABSTRACT

A sunroof assembly (20) of an automotive vehicle employs dual sunroof panes, a pair of movable sunshades and a control system for operating the function thereof. In one aspect of the present invention, a sunroof assembly provides a substantially transparent front pane (22) which is slidable from a covering position to a retracted position and a substantially transparent rear pane (24) movable from a covering position to an open position. In another aspect of the present invention, a sunroof assembly (20) provides a pair of substantially transparent panes in combination with a front sunshade (26) and a rear sunshade (28). The sunshades are movable from a functional position to a stowed position. In a further aspect of the present invention, a control system (32) provides an electric switch assembly (30), electrical circuit and software for operating the panes and sunshades.

25 Claims, 9 Drawing Sheets

U.S. PATENT DOCUMENTS

| | | |
|---|---|---|
| 4,664,439 | 5/1987 | Schaetzler et al. . |
| 4,671,564 | 6/1987 | Sumida et al. . |
| 4,679,846 | 7/1987 | Lux et al. . |
| 4,684,169 | 8/1987 | Igel et al. . |
| 4,699,421 | 10/1987 | Schaetzler et al. . |
| 4,709,959 | 12/1987 | Paerisch et al. . |
| 4,746,165 | 5/1988 | Fuerst et al. . |
| 4,749,227 | 6/1988 | Bienert et al. . |
| 4,811,985 | 3/1989 | Kruger et al. . |
| 4,835,449 | 5/1989 | Huehn . |
| 4,869,548 | 9/1989 | Nagata et al. . |
| 4,883,311 | 11/1989 | Kohlpaintner et al. . |
| 4,910,445 | 3/1990 | Borrmann . |
| 4,911,496 | 3/1990 | Fuerst . |
| 4,923,246 | 5/1990 | Takahashi et al. . |
| 4,941,706 | 7/1990 | Jardin . |
| 4,946,225 | 8/1990 | Jardin . |
| 4,978,165 | 12/1990 | Schreiter et al. . |
| 4,982,995 | 1/1991 | Takahashi . |
| 4,995,665 | 2/1991 | Ichinose et al. . |
| 5,018,783 | 5/1991 | Chamings et al. . |
| 5,026,113 | 6/1991 | DiCarlo et al. . |
| 5,029,937 | 7/1991 | Yamamoto . |
| 5,044,222 | 9/1991 | Tanaka et al. . |
| 5,069,500 | 12/1991 | Reihl et al. . |
| 5,085,622 | 2/1992 | Kohlpaintner et al. . |
| 5,090,767 | 2/1992 | Schreiter et al. . |
| 5,104,178 | 4/1992 | Bienert . |
| 5,141,283 | 8/1992 | Omoto et al. . |
| 5,154,482 | 10/1992 | Hayashi et al. . |
| 5,184,870 | 2/1993 | Bauhof . |
| 5,197,779 | 3/1993 | Mizuno et al. . |
| 5,248,278 | 9/1993 | Fuerst et al. . |
| 5,250,882 | 10/1993 | Odoi et al. . |
| 5,288,125 | 2/1994 | Huyer . |
| 5,405,185 | 4/1995 | Cheron et al. . |
| 5,447,355 | 9/1995 | Kelm . |
| 5,516,187 | 5/1996 | Zani et al. . |

FOREIGN PATENT DOCUMENTS

| | | |
|---|---|---|
| 1946161B2 | 1/1978 | Germany . |
| 3603314 | 8/1987 | Germany . |
| 3802379A1 | 8/1988 | Germany . |
| 3822258A1 | 3/1989 | Germany . |
| 3813049 | 11/1989 | Germany . |
| 3840119 | 5/1990 | Germany . |
| 3900361 | 7/1990 | Germany . |
| 4124505A1 | 10/1992 | Germany . |
| 58-218423 | 12/1958 | Japan . |
| 3197232A | 8/1991 | Japan . |
| 524437A | 2/1993 | Japan . |
| 2047636A | 12/1980 | United Kingdom . |
| 2077461A | 12/1981 | United Kingdom . |
| 2295801A | 6/1996 | United Kingdom . |
| WO 94/25301 | 11/1994 | WIPO . |

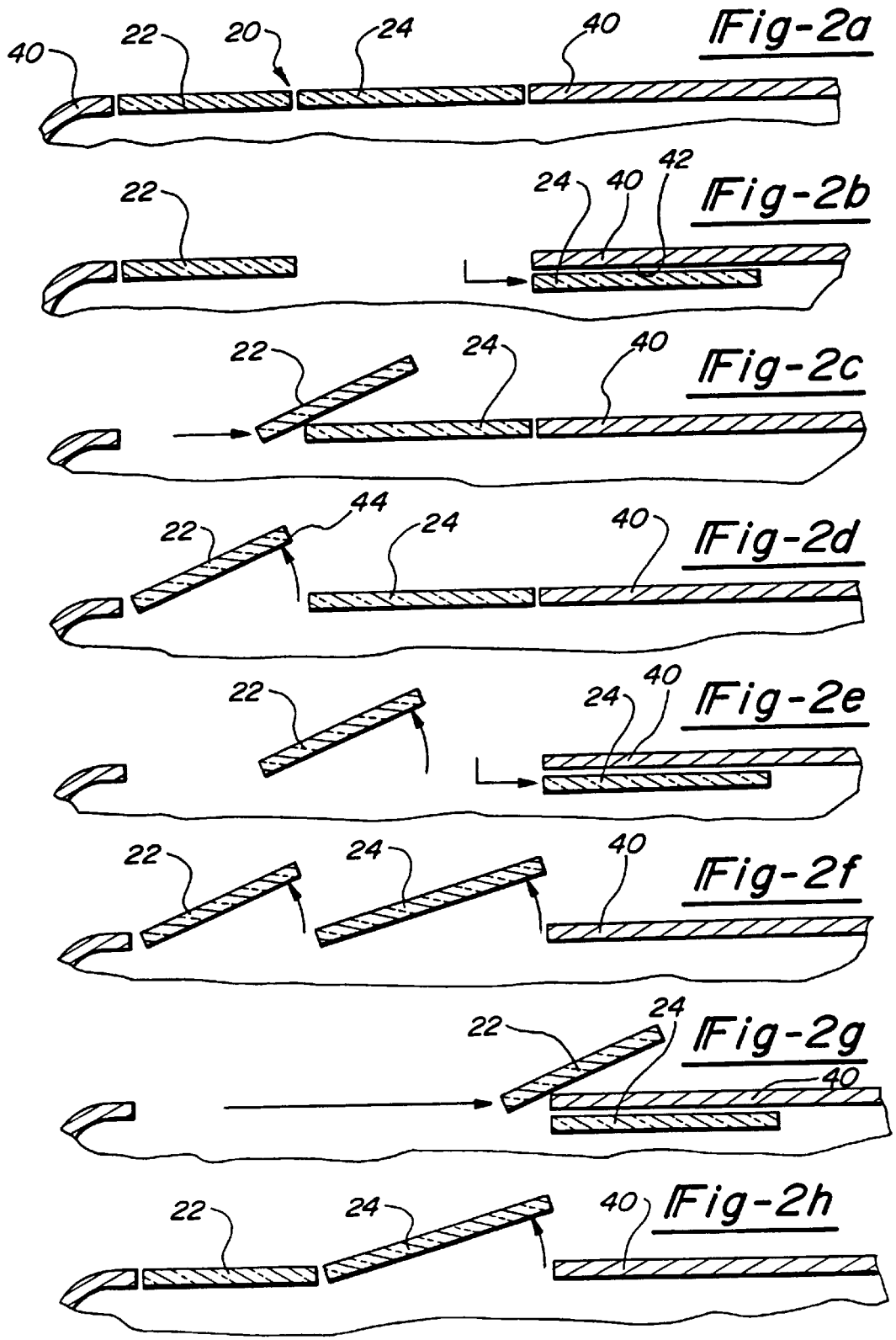

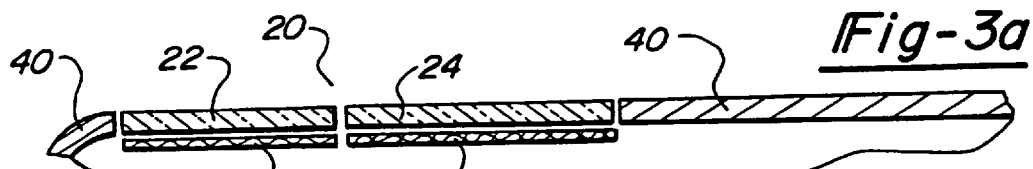
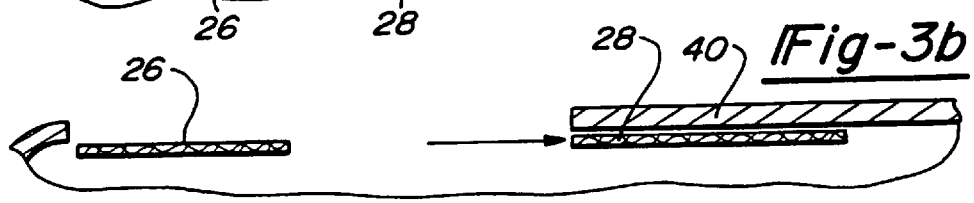
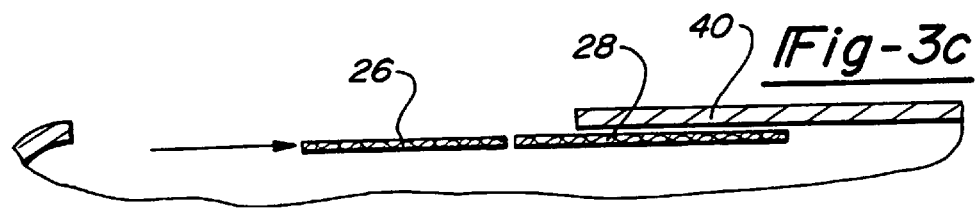
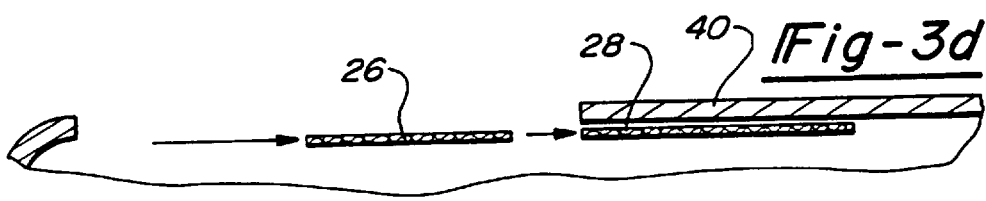
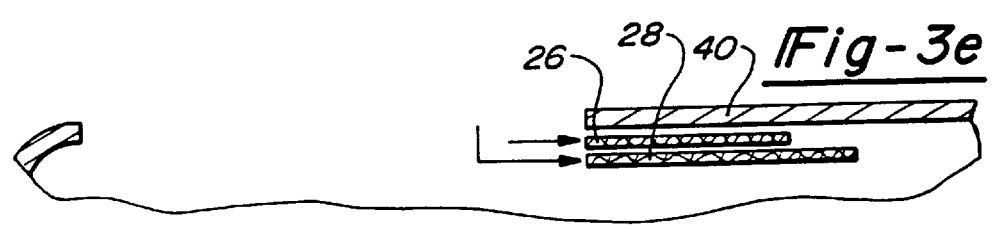
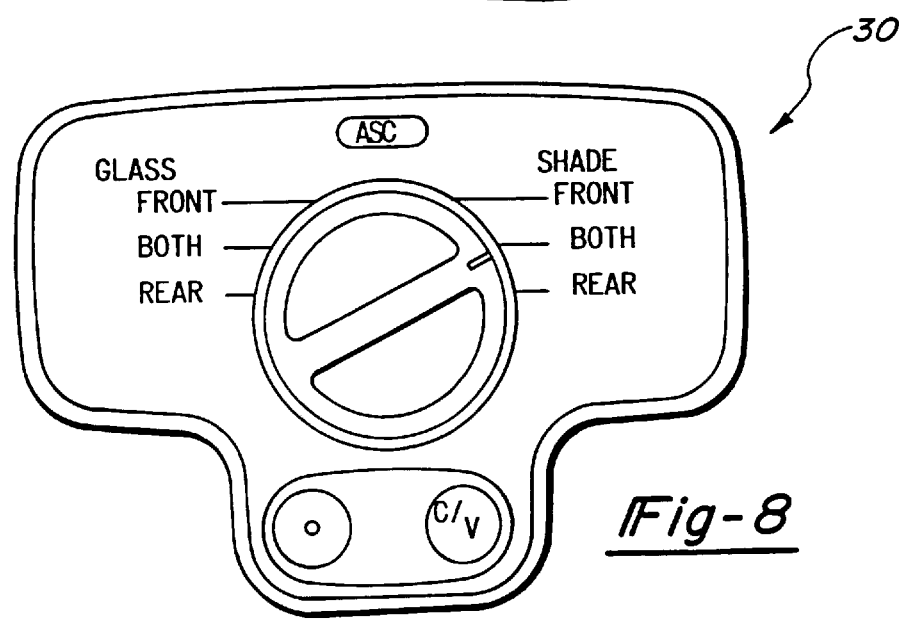

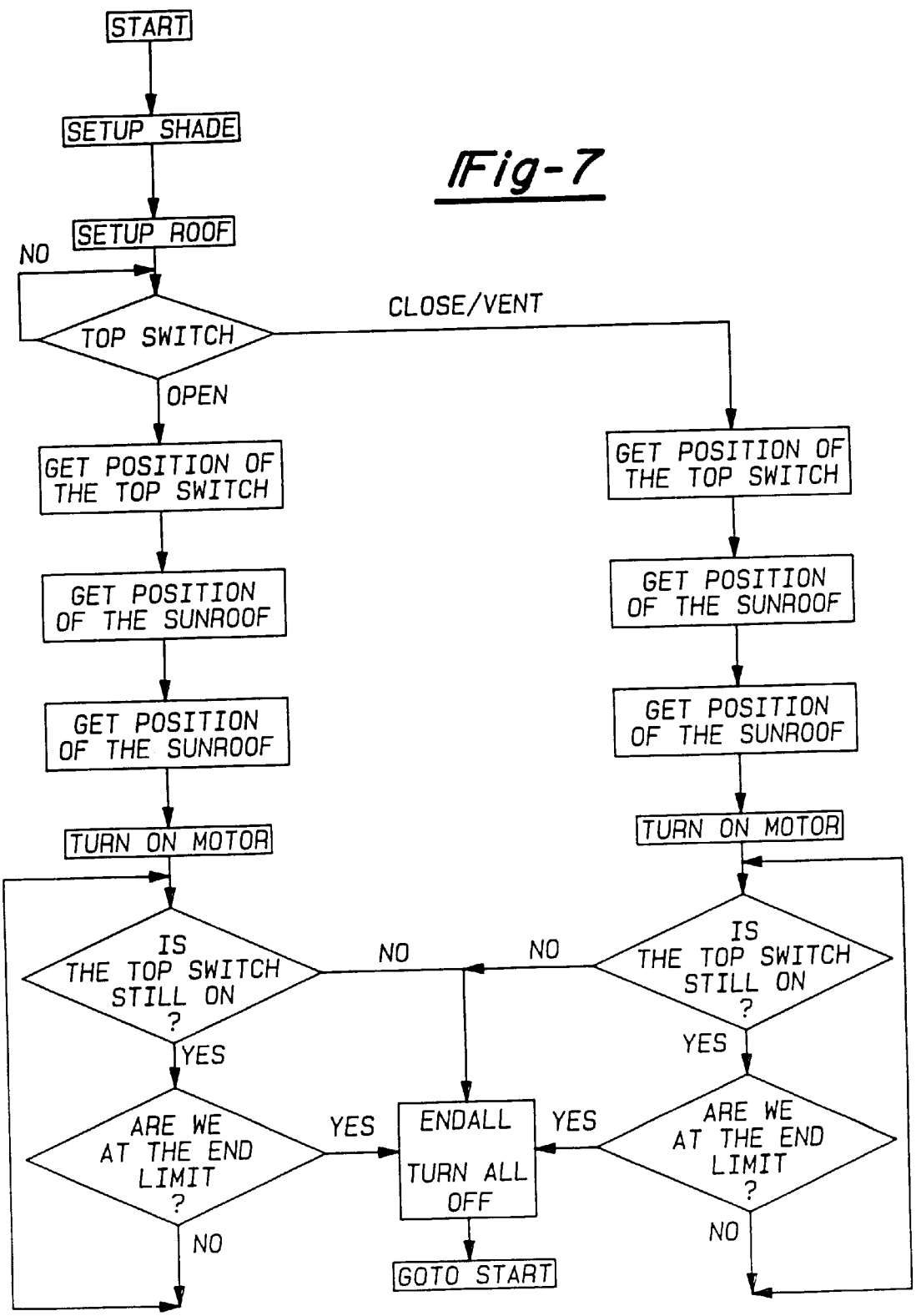

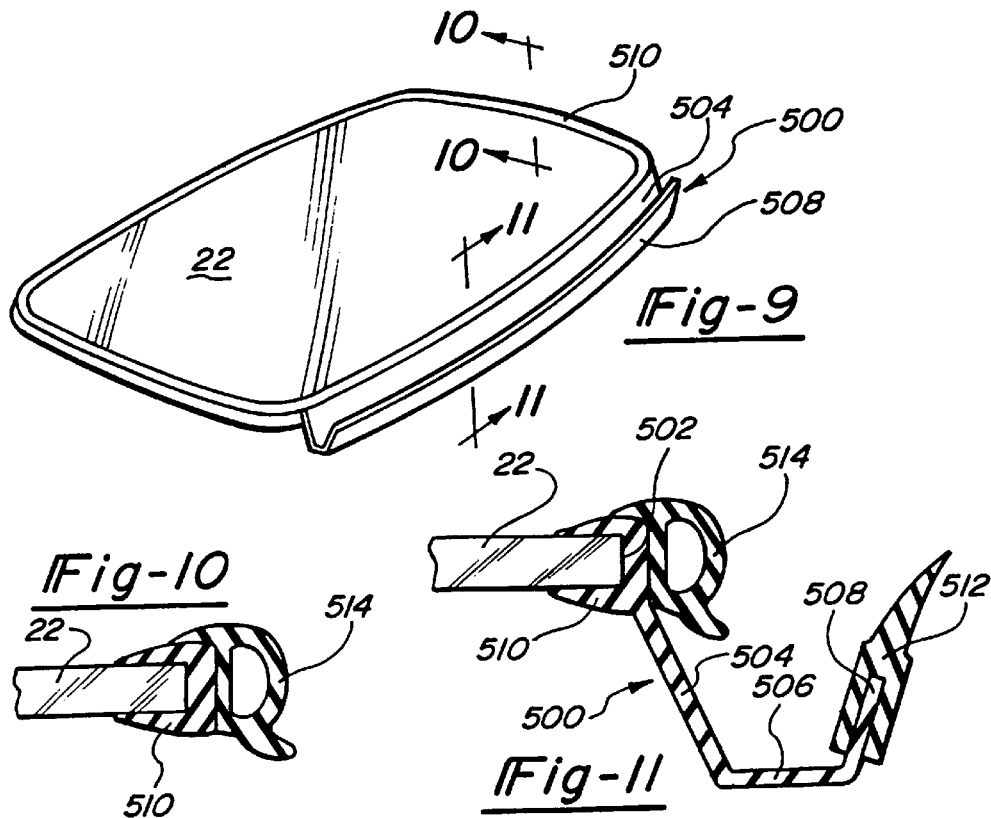
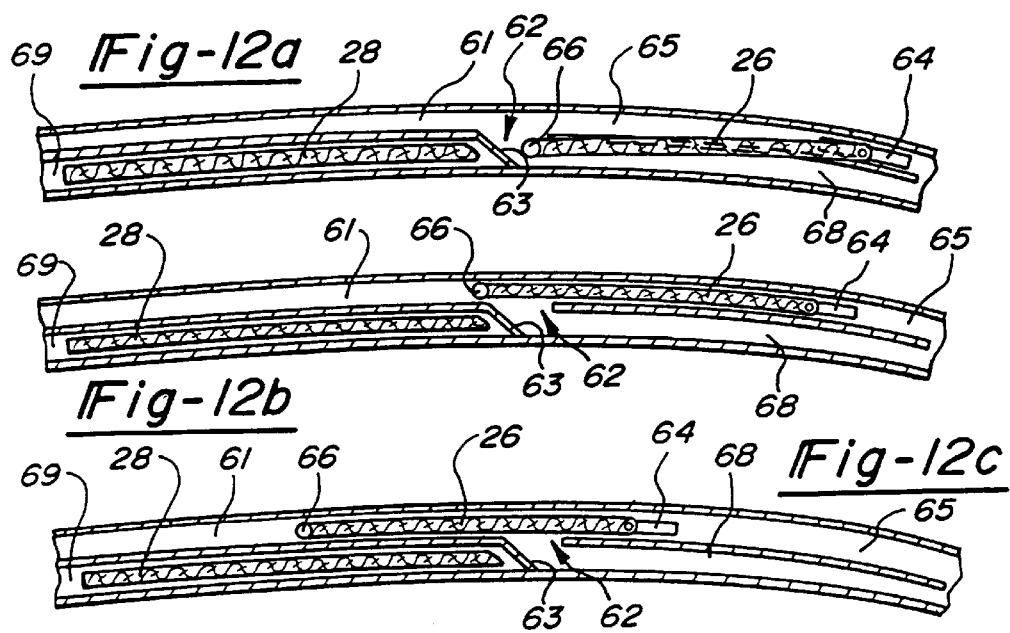

SUNROOF ASSEMBLY FOR AN AUTOMOTIVE VEHICLE AND CONTROL SYSTEM FOR OPERATING A SUNROOF ASSEMBLY

BACKGROUND AND SUMMARY OF THE INVENTION

This invention relates generally to sunroof assemblies for automotive vehicles and specifically to a dual sunroof assembly and a control system for operating same.

It is common knowledge to provide a single sunroof within a stationary roof of an automotive vehicle. These traditional sunroofs typically employ a transparent glass pane slidable from a covering position, somewhat flush to the roof, to a retracted position, which allows sunlight and ventilation access through an opening within the roof. Another traditional sunroof construction provides a transparent glass pane which is tiltable from a closed position to a pivoted venting position. This allows air from within the vehicle to pass through an opening created between the vented pane and the roof. A single sliding interior sunshade has also been employed with various of these sunroofs. Such sunshades are typically horizontally oriented and slidably movable to expose or cover a sunroof.

It is also known by those in the automotive industry to provide a pivotable wind deflector in front of a sliding spoiler-type sunroof. Such a construction is disclosed within U.S. Pat. No. 4,659,140 entitled "Vehicle Roof" which issued to Fuerst et al. on Apr. 21, 1987, and U.S. Pat. No. 5,069,501 entitled "Spoiler Control Mechanism" which issued to Baldwin et al. on Dec. 3, 1991, the disclosures of which are incorporated by reference herewithin. However, wind deflectors of this type merely pivot and do not slide to a retracted position. Thus, such a wind deflector limits the roof opening that would otherwise be disposed above the front seat occupants.

U.S. Pat. No. 4,786,102 entitled "Sun Roof Apparatus of Vehicle Roof" which issued to Sakamoto et al. on Nov. 22, 1988, attempts to further increase the effective roof opening, especially above the front seat, by employing a pair of movable covering panels. This device provides a rear cover panel which is detachably removable such that a front cover panel can be rearwardly slid. Provisions are also made for manually mounting the removed rear cover panel upon the retracted front cover panel. However, this system appears ungainly to operate especially while driving the automobile.

U.S. Pat. No. 5,197,779 entitled "Power Sliding Sunroof" which issued to Mizuno et al. on Mar. 30, 1993, discloses a pair of slidable sunroofs mounted in tracks on top of a stationary roof. The disclosure of this patent is incorporated by reference herewithin. However, this non-flush roof system is aesthetically prominent, is prone to excessive wind noise during vehicle driving and will cause excessive aerodynamic drag in all operating positions.

Various manual and motorized driving mechanisms have been used in combination with the aforementioned sunroofs. For motorized actuation, various electrical circuits have been employed to control operation of the operating mechanisms. One such circuit and switch for energizing a motorized drive is disclosed within U.S. Pat. No. 4,556,835 entitled "Operating Mechanism for Movable Parts, Especially for Sliding Roofs and Sliding/Lifting Roofs" which issued to Vogel et al. on Dec. 3, 1985, and is incorporated by reference herewithin. Another such circuit is discussed within UK Patent Application GB 2077461 entitled "Operating Mechanism for Tilting and Sliding Roof Panels." These circuits and switches, however, do not provide a means for controlling a pair of movable panes, a pair of movable sunshades, or any combination thereof.

In accordance with the present invention, the preferred embodiment of a sunroof assembly of an automotive vehicle employs dual sunroof panes, a pair of movable sunshades and a control system for operating the function thereof. In one aspect of the present invention, a sunroof assembly provides a substantially transparent front pane which is slidable from a covering position to a retracted position and a substantially transparent rear pane movable from a covering position to an open position. At least one of the panes is retractable below a stationary roof of the automotive vehicle. In another aspect of the present invention, a sunroof assembly provides a pair of substantially transparent panes in combination with a substantial opaque front sunshade and a substantially opaque rear sunshade. The sunshades are movable from a functional position to a stowed position. In a further aspect of the present invention, a control system provides an electric switch assembly, electrical circuit and software for operating the panes and sunshades. A unique sunshade guide rail system is also provided. The sunroof assembly of the present invention further employs a drain trough attached to a movable pane.

The sunroof assembly of the present invention provides many advantages over conventional sunroof constructions. For example, the present invention sunroof assembly allows for an increased roof opening when the panes are retracted and an increased daylight opening (or glass coverage space) when the panes are in a covering position. The sunroof assembly of the present invention is also easily operable to a fully or partially retracted position even while the vehicle is being driven. The present invention further employs a unique arrangement for stowing a pair of panes and sunshades in order to minimize headroom intrusion below the roof surface without increasing aerodynamic drag, wind noise or unsightliness when the panes are in their covering and unretracted positions. The control system of the present invention is advantageous over conventional systems by providing an easily accessible and operable switch, circuit and software for facilitating easy driver use which is also quite cost effective and efficiently constructed. The present invention control system prevents inadvertent collisions between panes and sunshades. Additional advantages and features of the present invention will become apparent from the following description and appended claims, taken in conjunction with the accompanying drawings.

BRIEF DESCRIPTION OF THE DRAWINGS

FIGS. 2a through 2h are diagrammatic longitudinal sectional views, taken along line 2—2 of FIG. 1, showing the various positions of a preferred embodiment of front and rear panes employed in the present invention sunroof assembly;

FIGS. 3a through 3e are diagrammatic longitudinal sectional views, also taken along line 2—2 of FIG. 1, showing a preferred embodiment of front and rear sunshades employed in the present invention sunroof assembly;

FIG. 7 is a flow chart of a computer process employed to operate the preferred embodiment of the control system and sunroof assembly of the present invention of FIGS. 1 and 6;

FIG. 8 is a true elevational view showing an alternate embodiment of the electrical switch assembly of the present invention of FIG. 4;

FIG. 9 is a perspective view showing a preferred embodiment drain trough attached to a pane of the present invention sunroof assembly of FIG. 1;

FIG. 10 is a sectional view, taken along line 10—10 of FIG. 9, showing the preferred embodiment drain trough of the present invention sunroof assembly;

FIG. 11 is a sectional view, taken along line 11—11 of FIG. 9, showing the preferred embodiment drain trough of the present invention sunroof assembly;

FIGS. 12a–12c are longitudinal sectional views, also taken along line 2—2 of FIG. 1, showing the various positions of the preferred embodiment sunshades in relation to first preferred embodiment sets of guide rails of the present invention sunroof assembly:

DETAILED DESCRIPTION OF THE PREFERRED EMBODIMENTS

Figure 1:
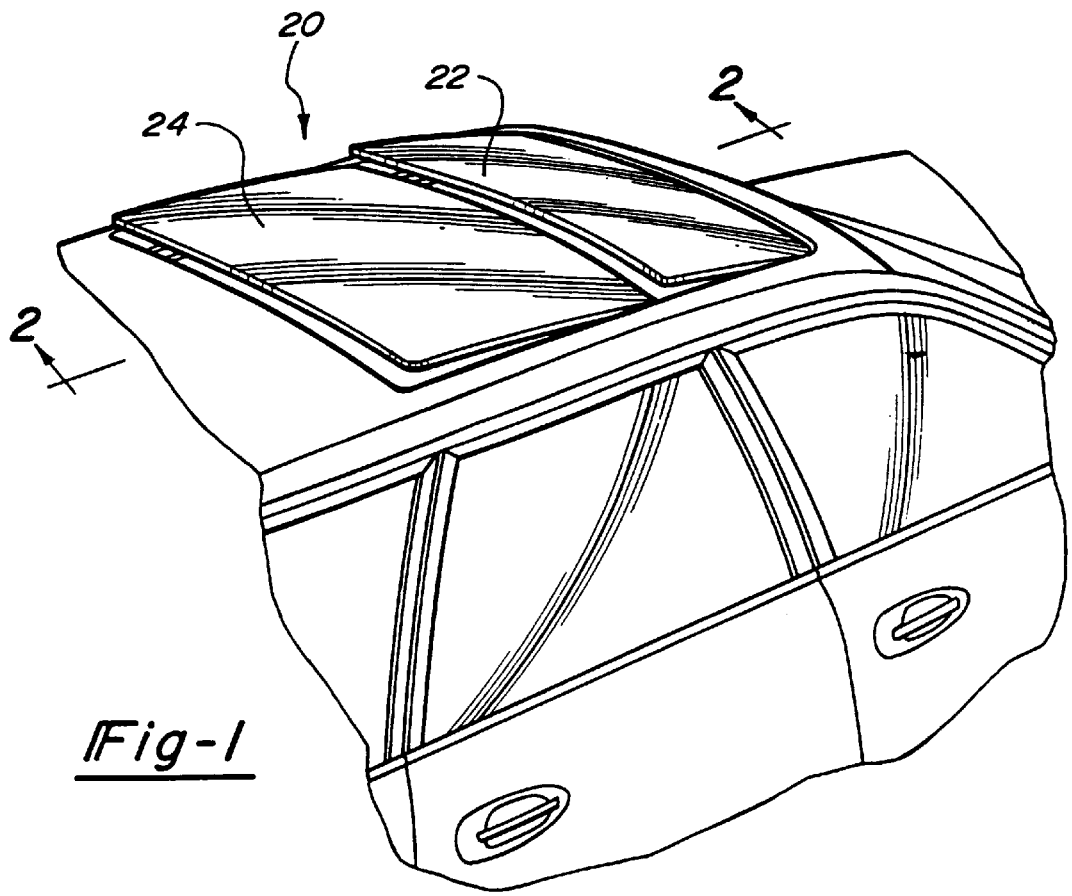
FIG. 1 is a rear perspective view showing a preferred embodiment of a sunroof assembly of the present invention employed in an automotive vehicle.

Referring to FIGS. 1 through 11, a preferred embodiment of a sunroof assembly 20 of the present invention has a front glass pane 22, a rear glass pane 24, a front sunshade 26, a rear sunshade 28, an operating mechanism, an electric switch assembly 30, a control system 32 and a drain trough. Sunroof assembly 20 is of a dual pane variety. Thus, both panes 22 and 24 can be opened to retracted positions to allow significantly increased sunlight and ventilation access through an opening within a stationary vehicle roof 40. As will be discussed in detail hereinafter, sunroof assembly 20 is optimally operated by control system 32 which is, in turn, activated by the conveniently accessible switch assembly 30.

The various pane positions are as follows. As can best be observed in FIG. 2a, front and rear panes 22 and 24, respectively, are nominally disposed in a covering or closed position substantially flush and sealed to roof 40. Referring to FIG. 2b, rear pane 24 is slidably movable to a retracted position below an inside surface 42 of roof 40. Rear pane 24 can also be moved to any intermediate position between its covering and retracted positions. In this operating condition, front pane 22 can be left in its covering position. FIG. 2c shows rear pane 24 left in its covering position while front pane 22 is moved to a partially retracted position defined by a majority of front pane 22 being angled above rear pane 24.

It should be noted that an open position is defined as including both the retracted and vent positions as applied to the front and rear panes, respectively 22 and 24, and the sunshades 26 and 28 (see FIG. 3e).

As can be observed in FIG. 2d, front pane 22 is pivoted to a vent position having a rear edge 44 tilted above roof 40. Rear pane 24 remains in its covering position. FIG. 2e depicts rear pane 24 slidably moved to its retracted position below roof 40 while front pane 22 is located in its partially retracted and vent position. FIG. 2f shows both front and rear panes, respectively 22 and 24, pivoted to their vent positions. Referring to FIG. 2g, rear pane 24 is slid to its retracted position below roof 40 and front pane 22 is in its fully retracted position substantially above roof 40. This position serves to minimize head room intrusion while allowing maximum roof opening over the front and rear seats. As can be observed in FIG. 2h, front pane 22 remains in its covering position and rear pane 24 is pivoted to its vent position.

An operating mechanism is used to operatively move and retain panes 22 and 24 as well as sunshades 26 and 28. The operating mechanism employed with the present invention is of a conventional variety such as that disclosed within U.S. Pat. Nos. 5,184,870 entitled "Raisable-Sliding Roof of Shallow Construction for Motor Vehicles" which issued to Bauhof on Feb. 9, 1993, and 4,671,564 entitled "Ventilating Device for a Roof Opening of Vehicles" which issued to Sumida et al. on Jun. 9, 1987, the disclosures of which are incorporated by reference herewithin. The operating mechanism includes the necessary guide rails, drain troughs, motors, cables, linkages and casings. However, various modifications were made to the guide rails and drain trough in order to optimize the dual sunroof construction of the present invention.

FIGS. 3a through 3e show the various operating positions of front sunshade 26 and rear sunshade 28. In FIG. 3a, front and rear sunshades 26 and 28 are disposed in their functional or closed locations juxtapositioned below their respective front and rear panes 22 and 24. FIG. 3b discloses rear sunshade 28 slidably moved to its stowed or open position below roof 40. This allows sunlight to enter through either rear pane 24 (see FIG. 3a) or the opening within roof 40. Referring to FIG. 3c, rear sunshade 28 is moved to an intermediate position while front sunshade 26 is slidably moved to a partially retracted position. Thus, front and rear sunshades 26 and 28, respectively, block sunlight from entering the area below rear pane 24 (see FIG. 3a). As can be seen in FIG. 3b, rear sunshade 28 is fully stowed while front sunshade 26 is moved to an intermediate position. FIG. 3e shows both front and rear sunshades 26 and 28, respectively, slidably moved to their respective stowed positions below roof 40.

Referring to FIGS. 9–11 and 15, a preferred embodiment of a drain trough 500 is movably mounted proximate to a rear edge 502 of each pane 22 and 24. However, drain trough 500 may additionally extend around other portions of the periphery of each one or both panes 22 and 24. In this embodiment, the pane preferably slides but does vent. Drain trough 500 has a C-shaped clasping portion 510 which is encapsulation molded, through conventional PVC or RIM processes, upon a peripheral portion of the substantially horizontal surfaces and rear edge 502 of each pane. A first leg 504 integrally extends angularly below clasping portion 510 and joins with a bottom portion 506. A second leg 508 outwardly and upwardly extends from bottom portion 506 thereby forming a substantially U-shaped cross sectional construction. A flange seal 512 is adhesively mounted upon a distal end of second leg 508 and a compression seal 514 is adhered to clasping portion 510 for sealing to the adjacent roof 40 and casing. While drain trough 500 is preferably molded as a single elastomeric member, first leg 504 may alternately be separately formed from metal, a polymeric resin, or a composite material, and then screwed or adhered to clasping portion 510, or directly to a pane. Of course, drain trough 500 may be defined by a variety of other shapes as long as it is movably attachable to a pane. Clasping portion 510 may alternately be flush molded upon a pane.

Figure 16:
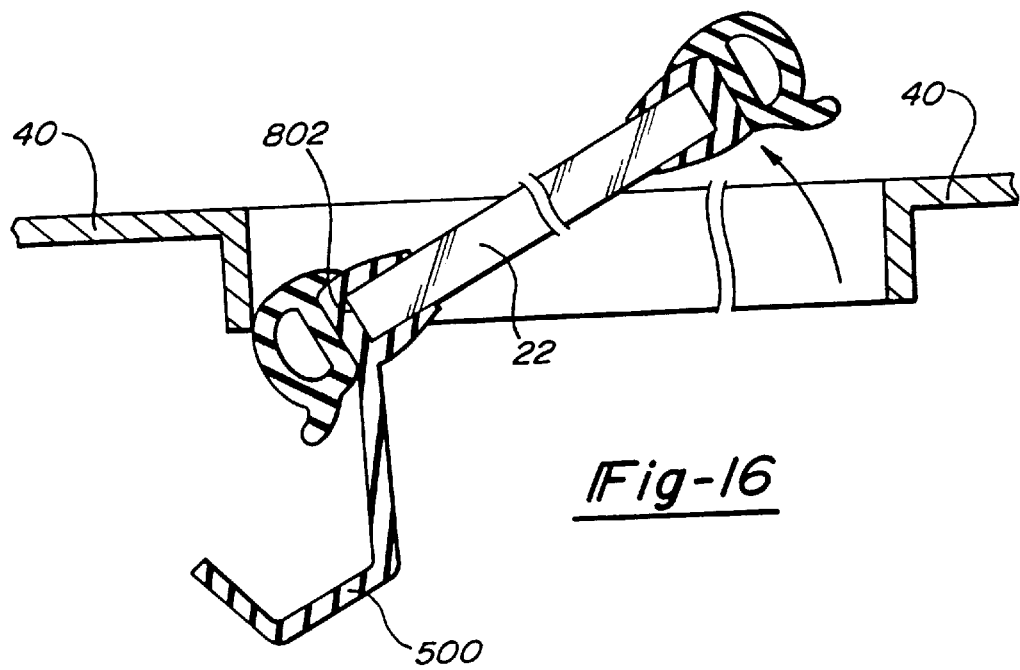
FIG. 16 is a longitudinal sectional view, taken along line 2—2 of FIG. 1, showing an alternate embodiment drain trough of the present invention in relation to a roof.

An alternate embodiment drain trough 500 is shown in FIG. 16. This drain trough 500 is attached to a front edge 802 of each pane 22 and 24 so as not to intrude within the passenger compartment and to allow for venting movement of each pane. Panes 22 and 24 may also slide within a single set of guide rails.

A first preferred embodiment, as shown in FIGS. 12a–12c, employs a first set of guide rails 61 having an access slot 62 and ramp 63 therein. A forward pivotable coupling means 64 attached to front sunshade 26 is sized larger than slot 62 and, thus, slides along an upper branch 65 of guide rails 61. A rearward pivotable coupling means 66 is attached to front sunshade 26 and is sized to enter slot 62 and slide down ramp 63 and along a lower branch 68 of guide rail 61 when in its covering position. A coupling means (not shown) is attached to rear sunshade 28 for slidable engagement with a second set of guide rails 69. This embodiment prevents an aesthetically undesirable step between front and rear sunshades 26 and 28, respectively. The appearance is further enhanced by crowning the sunshades.

Figure 13:
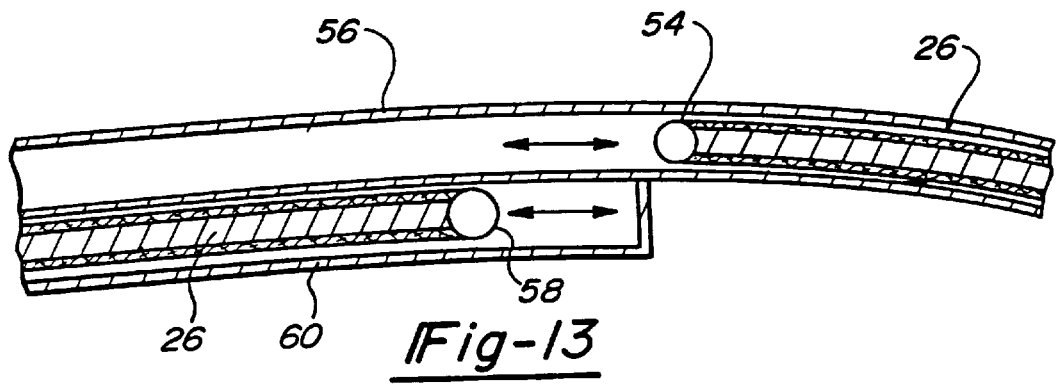
FIG. 13 is a longitudinal sectional view, also taken along line 2—2 of FIG. 1, showing the preferred embodiment sunshades in relation to second preferred embodiment sets of guide rails of the present invention sunroof assembly.

Referring to FIG. 13, the second preferred embodiment of the present invention sunroof assembly provides a coupling means 54 connected to front sunshade 26 for slidable engagement within a first set of guide rails 56. Similarly, a second coupling means 58 is connected to rear sunshade 26 for providing slidable engagement within a substantially parallel second set of guide rails 60. Moreover, synchronous movement between sunshades 26 and 28 is not required within the preferred embodiments to avoid undesirable collisions.

Figure 14:
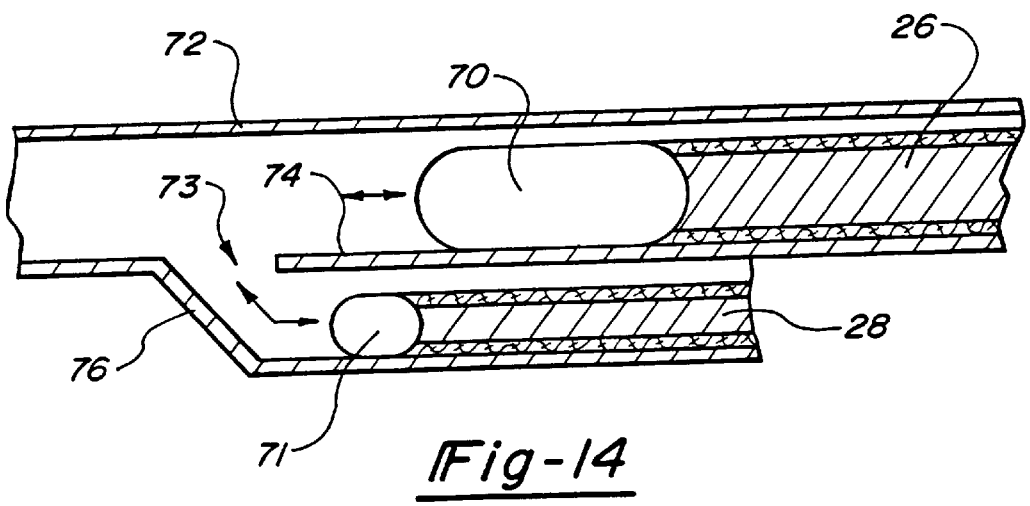
FIG. 14 is a longitudinal sectional view, also taken along line 2—2 of FIG. 1, showing the preferred embodiment sunshades in relation to an alternate embodiment set of guide rails of the present invention sunroof assembly.
Figure 15:
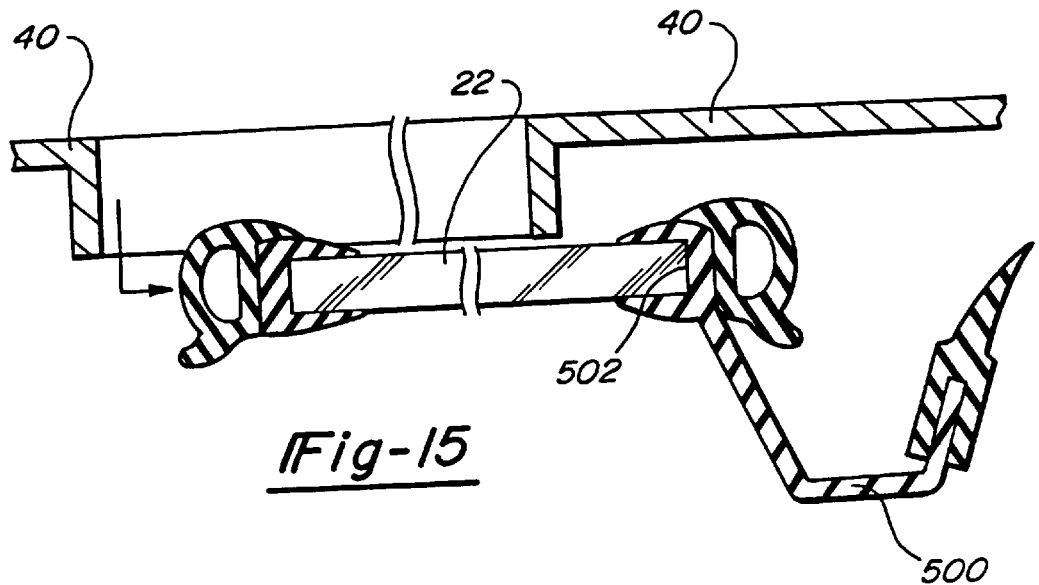
FIG. 15 is a longitudinal sectional view, taken along line 11—11 of FIG. 9, showing the preferred embodiment drain trough of the present invention in relation to a roof.

An alternate embodiment guide rail construction is shown in FIG. 14. In this embodiment, a coupling means 70 and 71 for both front and rear sunshades, respectively 26 and 28, are slidably engaged within a single set of guide rails 72. Guide rails 72 include an access slot 73 disposed within a median surface 74 and a ramp 76 positioned adjacent to slot 73 for downwardly directing a substantially identically sized forward and rearward set of coupling means 71 of rear sunshade 28 for movement to the retracted position thereof below roof 40 (see FIG. 2g). Coupling means 70 of front sunshade 26 is larger than coupling means 71 of rear sunshade 28. Therefore, coupling means 70 can slide above slot 73 and ramp 76 for movement to their retracted position below roof 40.

Figure 4:
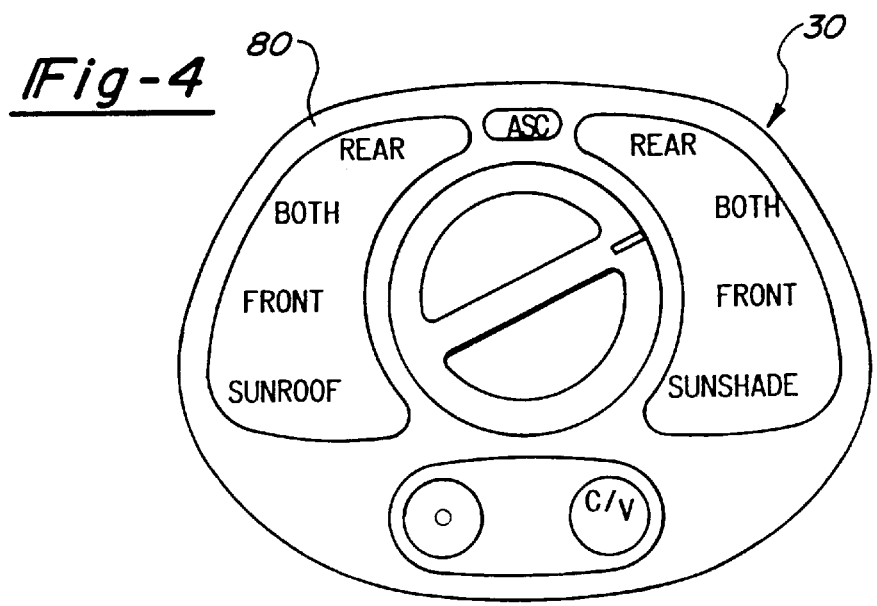
FIG. 4 is a true elevational view showing a preferred embodiment of an electrical switch assembly employed in combination with the sunroof assembly of the present invention of FIG. 1.
Figure 5:
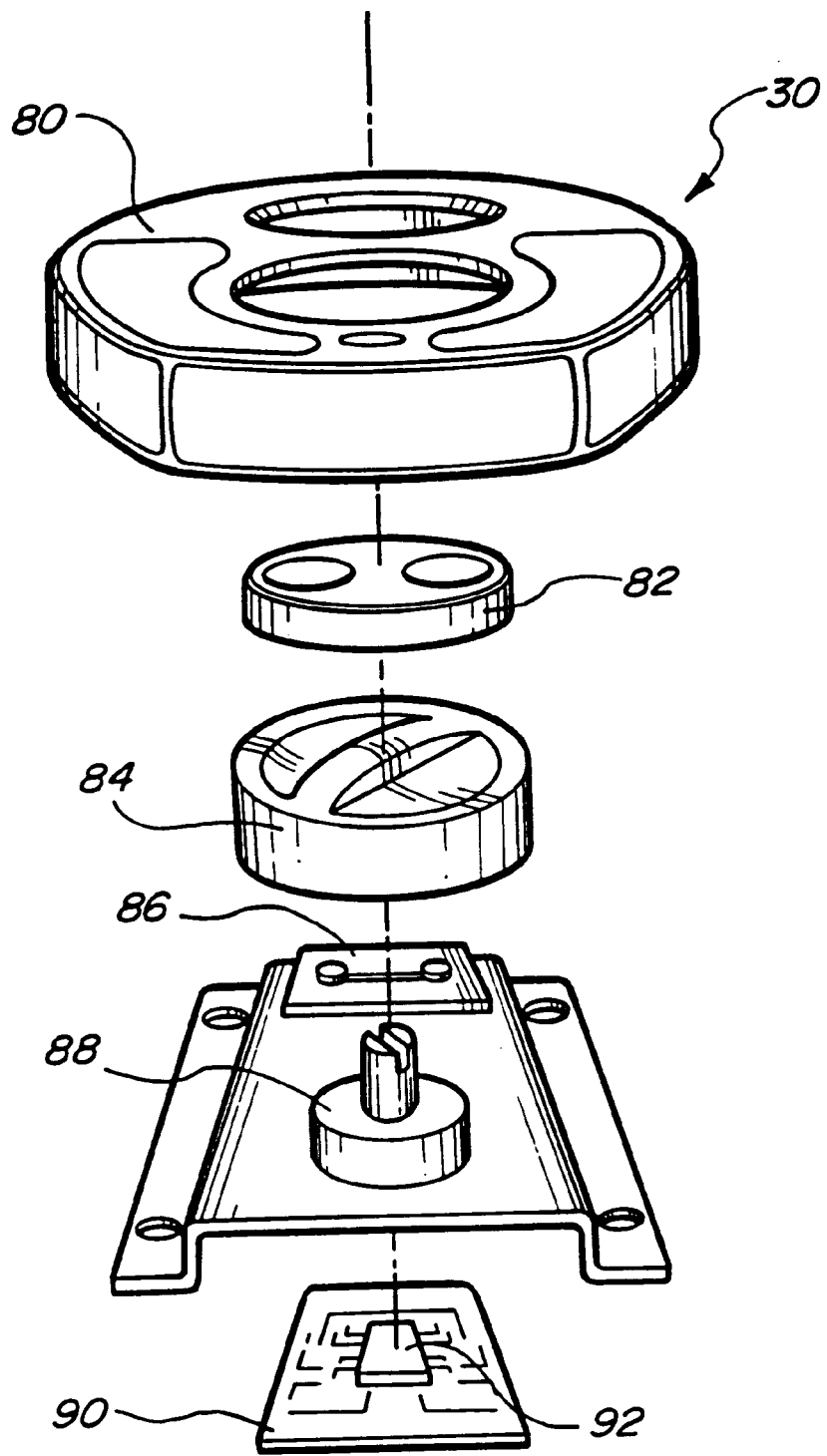
FIG. 5 is an exploded perspective view showing the preferred embodiment of the electrical switch assembly of FIG. 4.

The physical construction of the preferred embodiment of electrical switch assembly 30 can best be observed in FIGS. 4 and 5. Switch assembly 30 is mounted upon a headliner below a front header panel. Switch assembly 30 has a polymeric aesthetic bezel 80 with function selection graphics (eg., "sunroof," "front," "both," etc.) affixed thereto. Bezel 80 further has a pair of apertures through which project a polymeric rocker button 82 and a polymeric knob 84. Button 82 pivotably actuates a rocker switch 86 between an open "O", and a closed or vent "C/V" position. Knob 84 is rotatably engagable with a rotary dial switch 88. Rotary dial switch 88 is movable between sunroof-front, sunroof-both, sunroof-rear, ASC, sunshade-rear, sunshade-both and sunshade-front positions. The ASC position correlates to an all open/all closed position for both front and rear sunroofs and sunshades. Rocker switch 86 and rotary dial switch 88 are electrically connected to a printed circuit board 90 containing a microprocessor-based CPU 92. Switch assembly 30 is electrically coupled to printed circuit board 90 via multiplex wiring. However, conventional discrete wiring, metal traces or even fiber optic signal transmitting means can be employed. An alternate aesthetic embodiment of switch 30 of the present invention is shown in FIG. 8.

Figure 6:
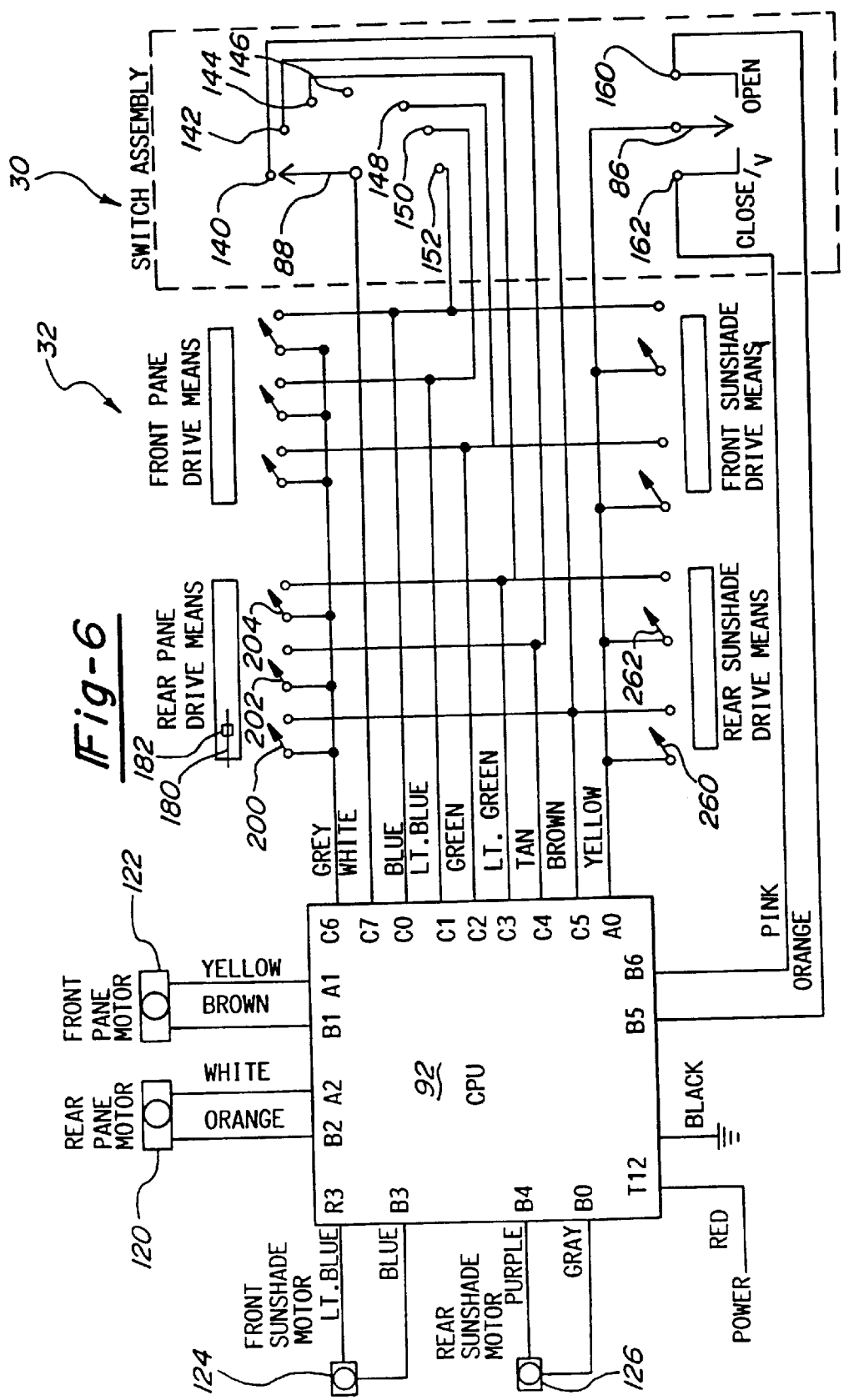
FIG. 6 is an electrical circuit diagram of the preferred embodiment control system employed to operate the sunroof assembly of the present invention of FIG. 1.

In one preferred embodiment of the present invention, electric switch assembly 30 serves to selectively operate control system 32 in order to cause the operating mechanism to move panes 22 and 24 as well as sunshades 26 and 28. Referring to FIG. 6, CPU 92 is preferably an off-the-shelf 24 pin PIC16C57 microchip which can be purchased from Digi-key of Thief Riverfalls, Minn. CPU 92 can selectively energize a rear pane motor 120, a front pane motor 122, a front sunshade motor 124 and a rear sunshade motor 126. Rotary dial switch 88 is electrically connected to CPU 92 for selectively switching between sunroof-front position 140, sunroof-both position 142, sunroof-rear position 144, ASC position (no current flow through the switch) 146, sunshade-rear position 148, sunshade-both position 150 and sunshade-front position 152. Rocker switch 88 is also electrically connected to CPU 92 so as to be energizable between open position 160 and closed/vent position 162.

A plurality of limit switches or other position sensing devices are electrically connected to CPU 92. In coordination with the limit switches, and as part of the operating mechanism to move the panes and sunshades, a drive means includes a cable 180 having a magnetic device 182 attached thereto. Rear pane motor 120 is of a DC fractional horsepower type having a pinion gear which drives cable 180. Cable 180 concurrently serves to move rear pane 24 (see FIG. 2b). A similar drive means is used for the other pane and the sunshades. In cooperation therewith, a first limit switch 200 senses a full closed or covering position of rear pane 24. A second limit switch 202 senses the vent position of rear pane 24. Furthermore, a third limit switch 204 senses the full open or retracted position of rear pane 24. These limit switches are operatively changed from a closed position to an open position and vice versa, by movement therepast of magnetic device 182. The limit switches associated with the front pane drive means operate in the same manner as that described for the rear pane drive means.

Magnetic device 182 associated with rear sunshade drive means serves to operate a fourth limit switch 260 and a fifth limit switch 262. Limit switch 260 senses the full open or stowed position of rear sunshade 28 (see FIG. 3b). Limit switch 262 senses the full closed or functional position of rear sunshade 28. Front sunshade drive means and limit switches act in a similar manner.

CPU 92 is controlled by software written in assembly language. A flow chart of this software is shown in FIG. 7. The assembly language code, referencing various circuits and pins shown in FIG. 6 is listed in the following Table 1.

TABLE 1

```
DEVICE PIC16C57,RC_OSC,WDT_OFF,PROTECT_OFF
        RESET   START
;
;OUTPUTS
;***************************
;
FglassO    =   ra.1     ;Yellow
FglassC    =   rb.1     ;Brown
RglassO    =   ra.2     ;White
RglassC    =   rb.2     ;Orange
FshadeO    =   ra.3     ;Lt Blue
FshadeC    =   rb.3     ;Blue
Rshadeo    =   rb.4     ;Pup
RshadeC    =   rb.0     ;Grey
MUXa       =   rc.6     ;Grey
MUXb       =   rc.7     ;White
MUXc       =   ra.0     ;Yellow
;
;
 ;INPUTS
;***************************
;;
;*                          *
;* a grounded bit = 1       *
;* at the chip              *
;***************************
SW0        =   rc.0     ;blue     front glass front limit/sun front
SW1        =   rc.1     ;ltblue   front glass mid limit/sun both
SW2        =   rc.2     ;green    front glass rear limit/sun rear
;
SW3        =   rc.3     ;ltgrn    rear glass front limit/sun front
SW4        =   rc.4     ;tan      rear glass mid limit/sun both
SW5        =   rc.5     ;brown    rear glass rear limit/sun rear
;
;
SWopen     =   rb.5     ;org      main switch open
SWclose    =   rb.6     ;pink     main switch close
;
;
BANK0      =   08h
BANK3      =   09h
BANK2      =   0Ah
set        =   10h
base       =   11h
count      =   12h
debounce   =   13h
Aport      =   05h
Bport      =   06h
motordelay =   14h
modeREG    =   15h
temp       =   16h
portC      =   07h      ;port c
roofpos    =   0Bh
switchpos  =   0Ch
shadpos    =   0Dh
mask       =   0Eh
timer      =   0Fh
;       BANK3    SUNSHADE
RRclFFcl   =   10h      ;RR = rear, cl = closed, FF = front, op = open, md
RRclFFmd   =   11h      ;xx = not at any switch
RRclFFop   =   12h
RRmdFFcl   =   13h
RRmdFFmd   =   14h
RRmdFFop   =   15h
RRopFFcl   =   16h
RRopFFmd   =   17h
RRopFFop   =   18h
RRxxFFcl   =   19h      ;USED ONLY FOR THE SUNROOF
RRxxFFmd   =   1Ah
RFxxFFop   =   1Bh
RRclFFxx   =   1Ch
RRmdFFxx   =   1Dh
RRopFFxx   =   1Eh
;ascSW        ds    1
;
;
;
;
START     org     0
          mov     FSR,#0000 0000b
```

TABLE 1-continued

```
            mov     Ira,#00000000b          ;1=input
            mov     Irb,#01100000b          ;0=output
            mov     Irc,#00111111b
            clrb    FglassO
            clrb    FglassC
            clrb    RglassO
            clrb    RglassC
            clrb    FshadeO
            clrb    FshadeC
            clrb    RshadeO
            clrb    RshadeC
            mov     BANK0,#0000 0000b
;           mov     BANK1,#0010 0000b
            mov     BANK2,#0100 0000b
            mov     BANK3,#0110 0000b
        ;   call    shortdelay
;****************************************************************
; SHADE SETUP
            mov     FSR,bank3       ;set bank 3
;                   RRR FFF
;                   xx omc omc
            mov     RRclFFcl,#00 001 001b   ;used for both shade &roof
            mov     RRclFFmd,#00 001 000b
            mov     RRclFFop,#00 001 100b
            mov     RRmdFFcl,#00 000 001b
            mov     RRmdFFmd,#00 000 000b
            mov     RRmdFFop,#00 000 100b
            mov     RRopFFcl,#00 100 001b
            mov     RRopFFmd,#00 100 000b
            mov     RRopFFop,#00 100 100b
            mov     mask,#00111111b         ;mask data input from sw
;****************************************************************
; ROOF SETUP
            mov     FSR,BANK2
        ;           RRR FFF
        ;           xx omc omc
            mov     RRclFFcl,#00 001 001b   ;used for both shade &roof
            mov     RRclFFmd,#00 001 010b
            mov     RRclFFop,#00 001 100b
            mov     RRclFFxx,#00 001 000b
            mov     RRmdFFcl,#00 010 001b
            mov     RRmdFFmd,#00 010 010b
            mov     RRmdFFop,#00 010 100b
            mov     RRmdFFxx,#00 010 000b
            mov     RRopFFcl,#00 100 001b
            mov     RRopFFmd,#00 100 010b
            mov     RRopFFop,#00 100 100b
            mov     RRopFFxx,#00 100 000b
            mov     RRxxFFcl,#00 000 001b
            mov     RRxxFFmd,#00 000 010b
            mov     RRxxFFop,#00 000 100b
            ljmp    page1
;****************************************************************
page1       org     513
swoff       jb      SWopen,swoff
            jb      SWclose,swoff
MAIN        jb      SWopen,run
            jb      SWclose,run
:loop       djnz    timer,:loop
            jmp     MAIN
RUN         call    scanSWpos
            csne    switchPOS, 100000000b   ;ASC pos.
            jmp     bothshad
            cjbe    switchpos,#00000111b,bothshad
            cja     switchpos,#00000111b,bothroof
        ;   jmp     bothroof
            jmp     MAIN
;****************************************************************
;****************************************************************
scanSWpos   mov     FSR,bank3               ;switch pos
            setb    MUXa
            setb    MUXb
            setb    MUXc
            clrb    MUXa
            mov     timer,#10
            clrb    MUXa
:loop       djnz    timer,:loop
            mov     switchpos,portc
            and     switchpos,MASK
```

TABLE 1-continued

```
                setb    MUXa
                setb    MUXa
                ret
scanSHpos       mov     FSR,bank3           ;sunshade pos
                setb    MUXa
                setb    MUXb
                setb    MUXc
                clrb    MUXc
                mov     timer,#10
                clrb    MUXc
:loop           djnz    timer,:loop
                mov     shadpos,portc
                and     shadpos,MASK
                setb    MUXc
                setb    MUXc
                ret
scanSRpos       mov     FSR,bank2           ;roof pos
                setb    MUXa
                setb    MUXb
                setb    MUXc
                clrb    MUXb
                mov     timer,#10
                clrb    MUXb
:loop           djnz    timer,:loop
                mov     roofpos,portc
                and     roofpos,MASK
                setb    MUXb
                setb    MUXb
                ret
;***********************************************************************
;shortdelay     mov     motordelay,#160     ;motor running delay
;
;:Mdelay        mov     set,#1              ;if count = 05 then set = 1
                                            ;if count = 50 then set = 16
                                            ;if count = 250 then set = 83
                mov     count ,#05          ;must be 5,50 or 250        ;1
                mov     base,#250                                       ;1
;:offset        djnz    set#,:offset        ;loop set times             48
;::loop         dec     base                ;loop 250 times             250
;               nop                         ;+I to count                250
;               nop                         ;+I to count                250
;               nop                         ;+I to count                250
;               nop                         ;+I to count                250
;               nop                         ;+I to count                250
;               jnz     :loop                                           500
;               ;                           first loop                  2000
;               djnz    count,:loop         ;loop 5 times               9995
;       ;       djnz    motordelay,:mdelay
;               ret                         ;loop 50 times              99950
;                                           ;loop 250 times             499750
;;IF COUNT IS 5 THEN TOTAL TICKS = 10000            @IOMhz = .001 sec
;;IF COUNT IS 50 THEN TOTAL TICKS = 100000          @IOMhz = .01 sec
;;IF COUNT IS 250 THEN TOTAL TICKS = 500001         @IOMhz = .05 sec
;;***********************************************************************
;;
;;***********************************************************************
;;
;bounceA        mov     FSR,bank0
;               mov     set,#16             ;if count = 05 then set = 1
;                                           ;if count = 50 then set = 16
;                                           ;if count = 250 then set = 83
;               mov     count 150           ;must be 5,50 or 250        ;1
;               mov     base,#250                                       ;1
;:offset        djnz    set,:offset         ;loop set times             48
;:loop          dec     base                ;loop 250 times             250
;               nop                         ;+I to count                250
;               nop                         ;+I to count                250
;               nop                         ;+I to count                250
;               nop                         ;+I to count                250
;               nop                         ;+I to count                250
;               jnz     :loop               ;                           500
;               ;                           first loop                  2000
;               djnz    count,:loop         ;loop 5 times               9995
;
;               ret                         ;loop 50 times              99950
;                                           ;loop 250 times             499750
;;IF COUNT IS 5 THEN TOTAL TICKS = 10000            @IOMhz =.001 sec
;;IF COUNT IS 50 THEN TOTAL TICKS = 100000          @IOMhz = .01 sec
;;IF COUNT IS 250 THEN TOTAL TICKS = 500001         @IOMhz = .05 sec
```

TABLE 1-continued

```
;;******************************************************************
;;******************************************************************
;;
EndALL          clrb    FglassO
                setb    rshadeC
                clrb    FglassC
                clrb    RglassO
                clrb    RglassC
                clrb    FshadeO
                clrb    FshadeC
                clrb    RshadeO
                clrb    RshadeC
                jmp     swoff
test            setb    fglassc
                setb    rglassc
                jmp     test
;;******************************************************************
;;
bothshad        jb      SWopen,:open
                jb      SWclose,:close
                jmp     endALL
:open       call    scanSWpos                           ;asc pos
            cje     switchpos,#0000 0000b,:both         ;asc pos
            and     switchpos,#0000 0111b
            cje     switchpos,#0000 0001b,:onlyfront
            cje     switchpos,#0000 0010b,:both
            cje     switchpos,#0000 0100b,:onlyrear
         ;  jmp     test
            jmp     endAll
:both       call    scanSHpos
            AND     shadpos,#00 000 100b
            cje     shadpos,RRmdFFop,:endF
            setb    FshadeO
:rear       call    scanSHpos
            AND     shadpos,#00 100 000b
            cje     shadpos,RRopFFmd,:endR
            setb    RshadeO
            call    scanSWpos                           ;asc pos
            cje     switchpos,#0000 0000b,bothroof      ;asc pos check
            jmp     bothshad
:endF       clrb    FshadeO
            clrb    FshadeC
            call    scanSWpos
            jmp     :rear
:endR       clrb    RshadeO
            clrb    RshadeC
            call    scanSWpos                           ;asc pos check
            cje     switchpos,0000 0000b,bothroof       ;asc pos check
            jmp     bothshad
:onlyfront  call    scanSHpos
            AND     shadpos,#00 000 100b
            cje     shadpos,RRmdFFop,endAll
            setb    FshadeO
            jmp     bothshad
:onlyrear   call    scanSHpos
            AND     shadpos,#00 100 000b
            cje     shadpos,RRopFFmd,endAll
            setb    RshadeO
            jmp     bothshad
:close      call    scanSRpos
            AND     roofpos,#00 001 001b
            cje     roofpos,RRclFFcl,:OK
            call    scanSWpos                           ,asc pos
            cje     switchpos,#0000 0000b,bothroof      ;asc pos
            jmp     endAll
:OK         call    scanSWpos                           ,asc pos
            cje     switchpos,#0000 0000b,:Cfront       ;asc pos
            call    scanSHpos
            and     switchpos,#0000 0111b
            cje     switchpos,#0000 0001b,:Conlyfront
            cje     switchpos,#0000 0010b,:Cfront
            cje     switchpos,#0000 0100b,:Conlyrear
            jmp     endAll
;
;
:Cfront     call    scanSHpos
            AND     shadpos,#00 000 001b
            cje     shadpos,RRmdFFcl,:endCF
            setb    FshadeC
:Crear      call    scanSHpos
            AND     shadpos,#00 001 000b
```

TABLE 1-continued

```
              cje     shadpos,RRclFFmd,:endCR
              setb    RshadeC
              jmp     bathshad
:endCF        clrb    FshadeO
              clrb    FshadeC
              jmp     :Crear
:endCR        clrb    RshadeO
              clrb    RshadeC
              jmp     bothshad
:Conlyfront   call    scanSHpos
              AND     shadpos,#00 000 001b
              cje     shadpos,RRmdFFcl,:endCF
              setb    FshadeC
              jmp     bothshad
:Conlyrear    call    scanSHpos
              AND     shadpos,100 001 000b
              cje     shadpos,RRclFFmd,:endCR
              setb    RshadeC
              jmp     bothshad
;***********************************************************
asc       ;   setb    ascSW
          ;   sb      ascSW
          ;   jmp     endAll
          ;   setb    FglassC
          ;   jmp     asc
              jmp     bothshad
;***********************************************************
rearroof      jmp     endAll
;***********************************************************
;***********************************************************
bothroof      jb      SWopen,:open
              jb      SWclose,:checkR         ;goto vent or close
              jmp     endALL
:checkR       call    scanSRpos
              AND     roofpos,#00 001 001b
              cje     roofpos,RRclFFcl,:vent
;             cje     roofpos,RRxxFFcl,:vent
;             cje     roofpos,RRclFFxx,:vent
              jmp     :close
:vent         call    scanSWpos
              and     switchpos,#0011 1000b
              cje     switchpos,#0010 0000b,:onlyfrontv
              cje     switchpos,#0001 0000b,:ventboth
              cje     switchpos,#0000 1000b,:onlyrearv
              jmp     endAll
:ventboth     call    scanSRpos
              AND     roofpos,#00 110 000b
              cje     roofpos,RRmdFFxx,:endRv
              cje     roofpos,RRopFFxx,:endRv
              setb    RglassO
:ventF        call    scanSRpos
              AND     roofpos,#00 000 110b
              cje     roofpos,RRxxFFmd,:endFv
              cje     roofpos,RRxxFFop,:endFv
              setb    FglassO
              jmp     :vent
:endRv        clrb    RglassO
              jmp     :ventf
:endFv        clrb    FglassO
              mov     timer,Aport
              AND     timer,#00000110b
              cje     timer,#00000000b,endAll
              jmp     :vent
:onlyrearv    call    scanSRpos
              AND     roofpos,#00 110 000b
              cje     roofpos,RRmdFFxx,endAll
              cje     roofpos,RRopFFxx,endAll
              setb    RglassO
              jmp     :onlyrearv
:onlyfrontv   call    scanSRpos
              AND     roofpos,#00 000 110b
              cje     roofpos,RRxxFFmd,endAll
              cje     roofpos,RRxxFFop,endAll
              setb    FglassO
              jmp     :onlyfrontv
:open         call    scanSWpos               ;asc pos check
              cje     switchpos,#0000 0000b,:front   ;asc pos check
              and     switchpos,#0011 1000b
              cje     switchpos,#0010 0000b,:onlyfront
```

TABLE 1-continued

|  | cje | switchpos,#0001 0000b,:front |  |
|---|---|---|---|
|  | cje | switchpos,#0000 1000b,:onlyrear |  |
|  | jmp | endAll |  |
| :front | call | scanSRpos | ;inter lock so that |
|  | AND | roofpos,#00 100 000b | ;the front will not |
|  | cse | roofpos,RRopFFxx | ;move until the rear |
|  | jmp | :rear | ;sunroof is open |
|  | call | scanSRpos |  |
|  | AND | roofpos,#00 000 100b |  |
|  | cje | roofpos,RRxxFFop,:endF |  |
|  | setb | FglassO |  |
| :rear | call | scanSRpos |  |
|  | AND | roofpos,#00 100 000b |  |
|  | cje | roofpos,RRopFFxx,:endF |  |
|  | setb | RglassO |  |
|  | call | scanSWpos | ;asc pos check |
|  | cje | switchpos,#0000 0000b,bothshad | ;asc pos check |
|  | jmp | bothroof |  |
| :endF | clrb | FglassO |  |
|  | clrb | FglassC |  |
|  | jmp | :rear |  |
| :endR | clrb | RglassO |  |
|  | clrb | RglassC |  |
|  | jmp | bothroof |  |
|  | mov | timer,Bport |  |
|  | AND | timer,#00000110b |  |
|  | cje | timer,#00000000b,endAll |  |
|  | jmp | bothroof |  |
| :onlyfront | call | scanSRpos | ;inter lock so that |
|  | AND | roofpos,#00 100 000b | ;the front will |
|  | cse | roofpos,RRopFFxx | ;move until the rear |
|  | jmp | bothroof | ;sunroof is open |
|  | call | scanSRpos |  |
|  | AND | roofpos,#00 000 100b |  |
|  | cje | roofpos,RRxxFFop,endAll |  |
|  | setb | FglassO |  |
|  | jmp | bothroof |  |
| :onlyrear | call | scanSRpos |  |
|  | AND | roofpos,#00 100 000b |  |
|  | cje | roofpos,RRopFFxx,endAll |  |
|  | setb | RglassO |  |
|  | jmp | bothroof |  |
| :close | jnb | SWclose,endAll |  |
|  | call | scanSWpos | :asc pos check |
|  | cje | switchpos,#0000 0000b,:Cfront | ;asc pos check |
|  | call | scanSWpos |  |
|  | and | switchpos,#0011 1000b |  |
|  | cje | switchpos,#0010 0000b,:Conlyfront |  |
|  | cje | switchpos,#0001 0000b,:Cfront |  |
|  | cje | switchpos,#0000 1000b,:Conlyrear |  |
|  | jmp | endAll |  |
| :Cfront | call | scanSRpos |  |
|  | AND | roofpos,#00 000 001b |  |
|  | cje | roofpos,RRxxFFcl,:endCF |  |
|  | setb | FglassC |  |
| :Crear | call | scanSRpos | ;inter lock so that |
|  | AND | roofpos,#00 000 001b | ;the front will not |
|  | cse | roofpos,RRxxFFcl | ;move until the rear |
|  | jmp | :close | ;sunroof is open |
|  | call | scanSRpos |  |
|  | AND | roofpos,#00 001 000b |  |
|  | cje | roofpos,RRclFFxx,:endCR |  |
|  | setb | RglassC |  |
|  | jmp | :close |  |
| :endCF | clrb | FglassO |  |
|  | clrb | FglassC |  |
|  | jmp | :Crear |  |
| :endCR | clrb | RglassO |  |
|  | clrb | RglassC |  |
|  | mov | timer,Bport | ;the motor port |
|  | AND | timer,#00000110b | ; |
|  | cje | timer,#00000000b,:okk | ;is the motor running |
|  | jmp | :close |  |
| :okk | call | scanSWpos | ;asc pos check |
|  | cje | switchpos,#0000 0000b,bothshad | ;asc pos check |
|  | jmp | endAll |  |
| :Conlyfront | call | scanSRpos |  |
|  | AND | roofpos,#00 000 001b |  |
|  | cje | roofpos,RRxxFFcl,endAll |  |

TABLE 1-continued

```
            setb      FglassC
            jmp       :close
:Conlyrear  call      scanSRnos
            AND       roofpos,#00 001 000b
            cje       roofpos,RRclFFxx,endAll
            setb      RglassC
            jmp       :close
;************************************************************
;************************************************************
;
frontroof   jmp       endall
;************************************************************
;
;
;************************************************************
;************************************************************
;************************************************************
;************************************************************
;************************************************************
;************************************************************
;************************************************************
;
```

In the aforementioned embodiment, the switch selectively energizes the control system and operating mechanism as follows. When both sunroof panes are in their covering positions and the rear sunroof open switch position is selected, the rear pane and rear sunshade open simultaneously to the position shown in FIGS. 2b and 3b. When both panes are closed and the front pane switch open position is selected, the front pane moves to the position shown in FIG. 2c and front sunshade moves simultaneously to the position shown in FIG. 3c. When both panes are in a covering position and the front pane vent switch position is selected, the front pane vents to the position shown in FIG. 2d while front sunshade simultaneously moves to the position of FIG. 3c. When front pane is either in a retracted or vented position (see FIGS. 2e and 2d, respectively), and the rear sunroof open switch position is selected, the front sunshade is already disposed at the position of FIG. 3c such that front and rear sunshades simultaneously move to the positions shown in FIG. 3e and rear pane moves to the position of FIG. 2e.

When both panes are in a covering or closed position and the both sunroof open switch position is selected, the rear panes and front and rear sunshades move simultaneously; the rear sunshade moves to the position of FIG. 3e and then front sunshade moves to the position also shown in FIG. 3e; the rear pane then moves to the position of FIG. 2g, after which, front pane slides to the retracted position also shown in FIG. 2g. When both sunroofs are covering and the rear sunroof vent switch position is selected, the rear sunshade moves to the position of FIG. 3b and rear pane moves to the position shown in FIG. 2h. When both panes are closed or covering and the sunroof-both vent switch position is selected, rear sunshade and front sunshade simultaneously move to the positions in FIG. 3e while front and rear panes simultaneously move to the position shown in FIG. 2f. The closing operations are in reverse order of the opening operations discussed above.

With the addition of a current sensing capability in the control system, both sunroof panes can be powered simultaneously to their retracted positions. The current sensing capability allows for the device to check for current rises that would indicate a potential collision or binding of the sunroof operating mechanism. With this current sensing capability, the ASC switching position would allow for coordinated and simultaneous sliding movement of both sunroof panes and both sunshades. A time dependency feature can also be added to the software to allow for express open or close features.

While the preferred embodiments of a sunroof assembly and control system therefore have been disclosed, it will be appreciated that various modifications may be made without departing from the present invention. For example, any control means, whether mechanical, electrical or software driven may be employed to operate the dual sunroof pane and dual sunshade system of the present invention. Furthermore, other software programs may be used in combination with the electrical circuit and switch disclosed above. Other electrical, mechanical or optical sensing means may be used with the control system. The novel control system, drain trough and sunshade guide rail constructions previously disclosed herein may be employed with dual or single sunroof systems. Moreover, both sunroof panes may be retracted to positions below the roof or above the roof. Also, many other manual or powered operating mechanisms and actuators can be used to slide, pivot or otherwise move each or all of the sunroof panes and sunshades. For example, solenoid, rack and pinion, and fluid pressure means may be employed to drive the panes and sunshades. The guide rail embodiments discussed heretofore may also be used to guide a pair of sunroof panes in addition to or instead of sunshades. Various materials have been disclosed in an exemplary fashion, however, a variety of other materials may of course be employed. It is intended by the following claims to cover these and any departures from the disclosed embodiments which fall within the true spirit of this invention.

The invention claimed is:

1. A control system for a sunroof assembly having a first pane, a second pane and a sunshade, the control system comprising:

a first electric motor operable to move the first pane;

a second electric motor operable to move the second pane;

a third electric motor operable to move the sunshade;

a central processing unit connected to the electric motors;

a vehicle occupant accessible switch assembly having a first pane circuit, a second pane circuit, a pane venting circuit and a sunshade circuit;

a first sensor operable to sense the position of the first pane; and a second sensor operable to sense the position of the second pane, each of the sensors being connected to the central processing unit and being operable to indicate at least one position of the pane to the central processing unit;

the central processing unit operably causing the first electric motor to move the first pane to a tilted venting position if the switch assembly energizes the pane venting circuit;

the central processing unit operably causing the panes to move independently from each other depending on the position of the switch assembly;

the central processing unit operably causing the panes to move synchronously with each other depending on the position of the switch assembly;

the central processing unit operably causing the third electric motor to move the sunshade if the switch assembly energizes the sunshade circuit;

the central processing unit deenergizing the first electric motor if the first sensor indicates that the first pane is in a first predetermined position; and the central processing unit deenergizing the second electric motor if the second sensor indicates that the second pane is in a second predetermined position.

2. The control system of claim 1 further comprising:

a second sunshade; and a fourth electric motor operable to move the second sunshade;

the central processing unit being operable to move the second sunshade through energization of the fourth electric motor.

3. The control system of claim 2 wherein the central processing unit is operable to cause the sunshades to move independently of each other.

4. The control system of claim 3 wherein the central processing unit is operable to cause the sunshades to move simultaneously with each other.

5. The control system of claim 1 wherein the switch assembly includes a first occupant accessible switch movable between the circuits.

6. The control system of claim 5 wherein the switch assembly includes a second occupant accessible switch movable to send a signal to the central processing unit which operably causes the central processing unit to move selected of the panes between moved positions.

7. The control system of claim 6 wherein the first switch is a rotary switch and the second switch is a rocker switch.

8. The control system of claim 1 wherein the third electric motor is operable to move the sunshade substantially horizontally in fore-and-aft direction.

9. A sunroof assembly comprising:

a first sunroof panel movable between open, closed and tilted venting positions;

a first actuator operable to move the first panel between the positions;

a second sunroof panel movable between open, closed and tilted venting positions;

a second actuator operable to move the second panel between the positions;

a sunshade movable between a sunblocking position and an open position;

a third actuator operable to move the sunshade between the positions;

an electric switch assembly having a single bezel, a first occupant accessible switch and a second occupant accessible switch, the switches being accessible through corresponding holes in the bezel; and a microprocessor connected to the switches and the actuators;

the microprocessor energizing the first and second actuators simultaneously if the switches are in a first orientation combination; and the microprocessor energizing the first actuator to move the first panel to the venting position without moving the second panel if the switches are in a second orientation combination.

10. The sunroof assembly of claim 9 wherein the microprocessor causes the panels to simultaneously move to the tilted venting positions and the sunshade to move to the open position if the switches are in the first orientation combination.

11. The sunroof assembly of claim 9 further comprising:

a second sunshade movable between a sunblocking position and an open position; and a fourth actuator operable to move the second sunshade between the positions;

the third actuator being energizable even if the fourth actuator is not energized.

12. The sunroof assembly of claim 9 wherein the microprocessor operably determines the position of the panels and the sunshade, determines the position of the switches and causes energization of the actuators.

13. The sunroof assembly of claim 9 wherein the microprocessor causes the third actuator to move the sunshade to a partially open position while causing the first actuator to move the first panel to the tilted venting position, the first panel is a substantially transparent front member and the second panel is a substantially transparent rear member.

14. A method of controlling a front sunroof panel, a rear sunroof panel, a front sunshade and a rear sunshade by using a processing unit, electric motors, position sensors and a vehicle occupant accessible switch assembly, the method comprising:

(a) closing a first electrical circuit with the switch assembly;

(b) receiving a first electrical signal by the unit, sent from the switch assembly, in response to (a);

(c) energizing a first of the motors in response to (b);

(d) moving the front panel in response to (c);

(e) receiving a second signal by the unit, sent from one of the sensors;

(f) deenergizing the first motor in response to (e);

(g) closing a second electric circuit with the switch assembly;

(h) receiving a third electrical signal by the unit, sent from the switch assembly, in response to (g);

(i) energizing a second of the motors in response to (h);

moving the rear panel in response to (i);

(k) receiving a fourth electrical signal by the unit, sent from a second of the sensors;

(l) deenergizing the second motor in response to (k);

(m) closing a third electric circuit with the switch assembly;

(n) receiving a fifth electrical signal by the unit, sent from the switch assembly, in response to (m);

(o) energizing a third of the motors in response to (n);

(p) moving the front sunshade in response to (o);

(q) closing a fourth electric circuit with the switch assembly;

(r) receiving a sixth electrical signal by the unit, sent from the switch assembly, in response to (q);

(s) energizing a fourth of the motors in response to (r);

(t) moving the rear sunshade in response to (s);

(u) determining if the switch assembly is in a condition to require simultaneous movement of the panels; and (v) determining if the switch assembly is in a condition to require movement of one of the panels without requiring movement of the other of the panels.

15. The method of claim 14 further comprising sensing electrical current changes of at least one of the motors.

16. The method of claim 15 wherein a rise in the current of at least one of the motors indicates difficulty of movement of one of the panels.

17. The method of claim 15 wherein a rise in the current of at least one of the motors indicates difficulty of movement of one of the sunshades.

18. The method of claim 14 further comprising sending a seventh electrical signal from the unit to the first and second motors to cause the panels to move to tilted venting positions.

19. The method of claim 18 further comprising sending an eighth electrical signal from the unit to the third and fourth motors to move the sunshades to open positions in a coordinated manner.

20. The method of claim 14 further comprising energizing at least one of the motors for a predetermined period of time.

21. The method of claim 14 further comprising continually energizing any of the motors until the corresponding of the panels and sunshades are in a desired position even if the vehicle occupant releases manual contact with the switch assembly.

22. An electric switch assembly for a sunroof, the assembly comprising:

a bezel having first and second holes;

a selecting switch corresponding with the first hole, the selecting switch being operable to selectively close electric circuits corresponding to a first sunroof pane member, a first sunshade member, a second sunroof pane member and a second sunshade member; and an operating switch corresponding with the second hole, the operating switch being operable to selectively move the member corresponding with the circuit selected by the selecting switch.

23. The assembly of claim 22 wherein the selecting switch is a rotary switch.

24. The assembly of claim 23 wherein the operating switch is a rocker switch.

25. The assembly of claim 22 further comprising a pane venting circuit selectable by one of the switches to operably cause tilting movement of at least one of the panes.

* * * * *

UNITED STATES PATENT AND TRADEMARK OFFICE
CERTIFICATE OF CORRECTION

PATENT NO.    : 6,056,352
DATED         : May 2, 2000
INVENTOR(S)   : Kip A. Ewing et al.

It is certified that error appears in the above-identified patent and that said Letters Patent is hereby corrected as shown below:

Title page,
Item [56], References Cited, U.S. PATENT DOCUMENTS, the following should be added:
-- 5,185,562    2/1993    Huyer
   5,045,765    9/1991    Wissler
   4,629,953    12/1986   Inoue et al. --
OTHER PUBLICATIONS, "Ford 1973" reference, "pp. 46-10-05" should be
-- 46-10-01 --.

Column 11,
Line 39, "set#,:offset" should be -- set.,:offset --.
Line 40, ":::loop" should be -- ;;:loop --.
Lines 43 and 44, ":+|" should be -- ;+| --.
Line 46, ";    jnz    :loop    500" should be -- ;    jnz    :loop    ;    500 --.
Line 48, ":loop" should be -- ;loop --.

Column 13,
Line 16, ";;" should be -- ; --.
Lines 20, 61 and 64, ",asc" should be -- ;asc --.

Column 15,
Line 3, "bathshad" should be -- bothshad --.

Column 17,
Line 14, "endF" should be -- endR --.
Line 30, after "will" insert -- not --.
Line 44, ":asc" should be -- ;asc --.

Column 19,
Line 44, delete "both".

UNITED STATES PATENT AND TRADEMARK OFFICE
CERTIFICATE OF CORRECTION

PATENT NO. : 6,056,352
DATED : May 2, 2000
INVENTOR(S) : Kip A. Ewing et al.

It is certified that error appears in the above-identified patent and that said Letters Patent is hereby corrected as shown below:

<u>Column 22,</u>
Line 55, before "moving" insert -- (j) --.

Signed and Sealed this

Ninth Day of March, 2004

JON W. DUDAS
*Acting Director of the United States Patent and Trademark Office*